United States Patent [19]

Hicks

[11] Patent Number: 5,099,275
[45] Date of Patent: Mar. 24, 1992

[54] LENS POSITIONING MECHANISM AND METHOD OF USING SAME

[76] Inventor: Ray Hicks, 2605 Corunna Rd., Flint, Mich. 48503

[21] Appl. No.: 657,009

[22] Filed: Feb. 19, 1991

[51] Int. Cl.⁵ .......................................... G03B 27/52
[52] U.S. Cl. ..................................... 355/55; 355/46; 355/54
[58] Field of Search ............... 355/53, 54, 46, 56-58

[56] References Cited

U.S. PATENT DOCUMENTS

| | | | |
|---|---|---|---|
| 3,689,149 | 9/1972 | Livingood | 355/46 |
| 3,951,565 | 4/1976 | Lucht | 355/46 |
| 4,583,845 | 4/1986 | Lucht et al. | 355/46 |
| 4,737,825 | 4/1988 | Davis | 355/54 |

*Primary Examiner*—Richard A. Wintercorn
*Attorney, Agent, or Firm*—Krass & Young

[57] ABSTRACT

A mechanism for selectively positioning a plurality of different lens units along the optical center-line of a photographic printer. The lens units are mounted on a common carrier and are successively moved into alignment along the optical center-line in response to overall movement of the common carrier, such as along a path that is oblique to the optical center-line. The plurality of different lens units are typically arranged substantially horizontally with respect to one another on the common carrier, and typically include a plurality of lenses having different powers of magnification of focal lengths. The common carrier engages a threaded drive bar disposed substantially parallel to the path that is oblique to the optical center-line to produce movement of the common carrier in relation to the optical center-line. The drive system cooperates with a guide means to retain the original orientation of the common carrier as the common carrier moves along the oblique path. A mask operates to isolate the remaining lens units from the photographic printer. The invention herein further includes an invention methodology for exposing a photographic print on an elongated web of photographic paper from an elongated strip of photographic negative images in a photographic printer using the mechanism previously described.

23 Claims, 4 Drawing Sheets

LENS POSITIONING MECHANISM AND METHOD OF USING SAME

FIELD OF THE INVENTION

The present invention relates to commercial photographic printers, and, more specifically, to lens positioning mechanisms for such commercial photographic printers and methods for their use.

BACKGROUND OF THE INVENTION

Photographic printers typically include a combination of several basic components for the printing process. A negative feed and holder assembly typically operates to store and transport an elongated strip of negative film images. The negative holder assembly also operates to orient a single selected negative image in a position for use in the printing process. A photographic paper feed and holder assembly typically operates to store and transport an elongated web of light sensitive photographic paper. The paper holder assembly also operates to orient a selected area of the web in a position for use in the printing process. A source of light operates to project light through the selected negative image onto the photographic paper. A lens, or group of lenses, positioned between the negative and photographic paper operates to focus and/or transmit the light onto the photographic paper to produce the desired image, or group of images. These basic components are typically housed in a framework that allows an operator to conveniently control the printing process.

Photographic printers typically take the form of either a "proof" or "package" photographic printer arrangement. As a basic distinction, a "proof" printer is adapted to print individual photographic prints from a given negative, while a "package" printer is adapted to print 11 × 14 sheets having groups of various size photographic prints from a single negative. Using an exposure of a school student as an example, a "proof" printer would initially be used to print a single image, or a series of images at various exposure levels, of the child for use in initially reviewing the quality of the print. A "package" printer would thereafter be used to produce the multi-image sheets of photographs that parents purchase each year of their children's school pictures.

Operators of photographic printers are generally confronted with the task of exposing various size photographic images from various size negative images. Generally speaking, multiple lenses are needed to produce multiple size photographic images from various size negatives. U.S. Pat. No. 3,951,545, issued on Apr. 20, 1976, discloses a package printer arrangement having a lens carrier assembly housing a plurality of lens boards mounted in a stacked and spaced relationship to one another. A series of external plungers operate to slide the lens boards into operative positions. To accommodate for printing from different size negatives, this reference discloses the manual replacement of a singe lens board or the entire lens carrier assembly. U.S. Pat. No. 4,583,845, issued on Apr. 22, 1986, discloses a printer arrangement having a lens assembly housing a carousel rotatably supporting a plurality of lens assemblies about a series of plungers. This reference, commonly assigned to the same entity as the first reference discussed, specifically attempts to increase the number of lens configurations available as disclosed in the first prior art reference without requiring a manual substitution of one lens assembly for another. These devices require multiple actuators, drive assemblies, support units, and biasing devices to operate. This multiplicity of components is costly to manufacture, repair, and maintain. Further, the lens assemblies of the prior art are spring biased toward the inoperative position. This biasing arrangement produces various impact forces on the equipment during operation of the devices that may adversely affect the continued performance of the equipment.

Thus, there is a need in the industry to provide an efficient and inexpensive mechanism by which individual lenses, or multiple lens units, may be aligned along the optical center-line of a photographic printer to allow for the exposure of a variety of size photographic prints from a variety of sizes of photographic negative images.

SUMMARY OF THE INVENTION

The present invention provides a mechanism for selectively positioning a plurality of different lens units along the optical center-line of a photographic printer. In the disclosed embodiment, the lens units are mounted on a common carrier and are successively moved into alignment along the optical center-line in response to movement of the common carrier along a path that is oblique to the optical center-line. In this manner, a plurality of different photographic exposures can be made from a single negative image.

In the preferred embodiment, the plurality of different lens units are arranged substantially horizontally with respect to one another on said common carrier. Each of the plurality of different lens units typically include a plurality of lenses having different powers of magnification or focal lengths. This arrangement allows a single drive system to operatively control the placement of the selected lens or lens unit from the group of available lenses or lens units.

In the disclosed embodiment, the drive system for the mechanism includes a threaded drive bar disposed substantially parallel to the path that is oblique to the optical center-line. Further, the common carrier is adapted to engage the threaded drive bar so that rotation of the threaded drive bar about its longitudinal axis causes the common carrier to move along the path which is oblique to the optical center-line.

In the disclosed embodiment, the drive means operative to rotate the threaded drive bar about its longitudinal axis to cause the common carrier to move along a path that is oblique to the optical center-line includes a stepper motor operatively connected to the drive bar. The stepper motor is electronically controlled so as to controllably rotate the drive bar in stages of known amounts to produce movement of known distances in the common carrier.

Preferably, the drive system cooperates with a guide means to retain the original orientation of the common carrier as the carrier moves along the path that is oblique to the optical center-line in response to rotation of the threaded drive bar. This guide means includes at least one substantially non-threaded guide shaft mounted substantially parallel to the drive bar. The common carrier is adapted to engage this guide shaft. This guide system maintains the alignment of the common carrier within the mechanism so that the lenses, or lens units, will be systematically aligned along the optical center-line solely by rotation of the drive bar.

In the disclosed embodiment, the mechanism further includes a mask operative to allow the lens unit aligned along the optical center-line to be used in connection with the photographic printer, while optically isolating the remaining lens units from the photographic printer. Preferably, the mask is positioned proximate to the common carrier and includes an opening aligned along the optical center-line. The mask is adapted to move in a direction parallel to the optical center-line in response to movement of the common carrier. Such parallel movement does not affect the alignment of the opening with respect to the optical center-line.

Further, the mask is substantially fixed with respect to movement perpendicular to the optical center-line so as to maintain the alignment of the opening with respect to the optical center-line. To accomplish this aspect, the mechanism includes at least one secondary guide shaft disposed parallel to the optical center-line. The mask is adapted to slidably engage the secondary guide shaft so as to allow movement of said mask parallel to the optical center-line and prevent movement perpendicular to the optical center-line. In this manner the opening on the mask remains aligned on the optical center-line. This allows the mask to optically isolate the lens units which are not aligned along the optical center-line from the photographic printer.

The present invention, further provides an invention methodology for exposing a photographic print on an elongated web of photographic paper from an elongated strip of photographic negative images in a photographic printer. This method includes the step of providing a common carrier operatively positioned along the optical center-line between the elongated web of photographic paper and the elongated strip of photographic negatives. The method further includes the steps of providing a plurality of different lenses on the common carrier, and manipulating the common carrier so as to position one of the plurality of lenses in alignment along the optical center-line. Finally, the method includes the step of exposing a photographic image on the web of photographic paper along the optical center-line through the positioned lens.

A separate inventive method for exposing a photographic print in a photographic proof printer includes the step of providing a plurality of lenses having different powers of magnification proximate the optical center-line connecting the elongated web of photographic paper and the elongated strip of photographic negatives. The method further includes the step of manipulating the lenses so as to position one of the plurality of lenses in alignment along the optical center-line. Finally, the method includes the step of exposing a photographic image on the web of photographic paper along the optical center-line through the positioned lens.

BRIEF DESCRIPTION OF THE DRAWINGS

These and other objects and aspects of the invention will become apparent in the detailed description of the invention hereinafter with respect to the drawings in which.

DETAILED DESCRIPTION OF THE PREFERRED EMBODIMENT

The present invention provides a mechanism for selectively positioning a plurality of different lenses along the optical center-line of a photographic printer. The lenses are successively moved into alignment along the optical center-line in response to movement of the common carrier along a path which is oblique to the optical center-line. In this manner, a plurality of different photographic exposures can be made from individual negative images utilizing an efficient and inexpensive mechanism. Alternatively, the present invention allows for the production of a plurality of similarly sized photograph exposures from a plurality of different sized negatives.

Figure 1:
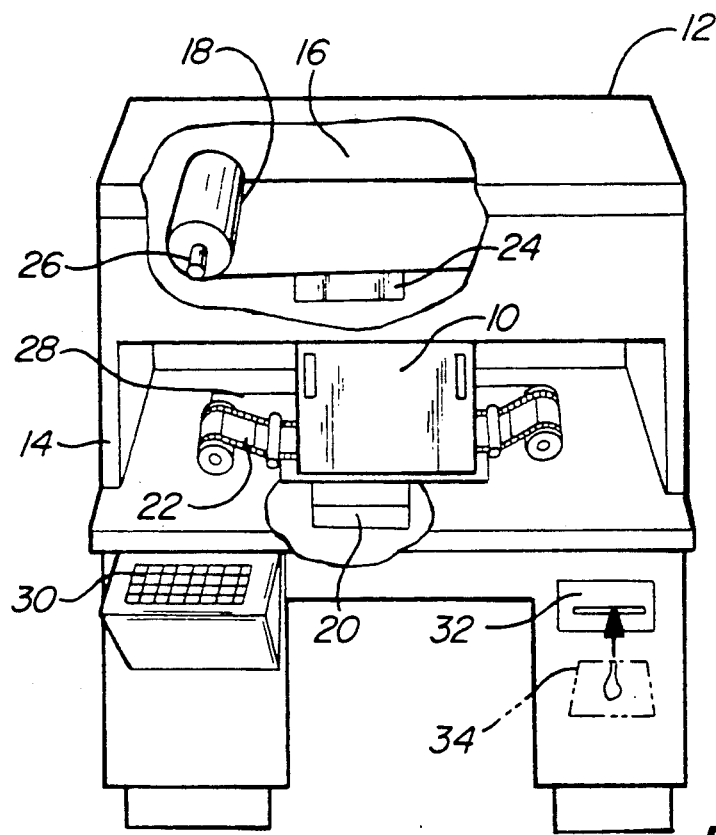
FIG. 1 is a perspective view of the invention lens deck attached to a representative photographic printer.

With reference to FIG. 1, the lens deck 10 of the present invention is removably positioned on a photographic printer 12. The photographic printer 12 typically comprises a frame 14, in the general form of a desk arrangement, which provides an enclosed compartment 16 for an elongated web of light sensitive photographic paper 18. A light source 20 directs light through an individual negative from an elongated strip of negatives 22 located on a negative film drive unit 28 adapted to store and transport the strip of negatives 22 during operation of the printer 12. The light from the light source 20 is also projected through at least one of the lenses in the lens deck 10 and through the exposure aperture area 24 associated with the enclosed compartment 16, to expose a corresponding area of the photographic paper 18 with an image from the selected negative. The photographic paper drive apparatus 26 and the photographic negative film drive unit 28 thereafter operate to dispose another area of the photographic paper web 18 and another negative on the strip of negatives 22 for subsequent photographic print processing. To facilitate and/or automate the printing process, the printer 12 typically utilizes computerized systems for various aspects of the printing process, and therefore have external control systems such as keyboard 30 and data input means 32 for use with removable memory disks 34.

Figure 2:
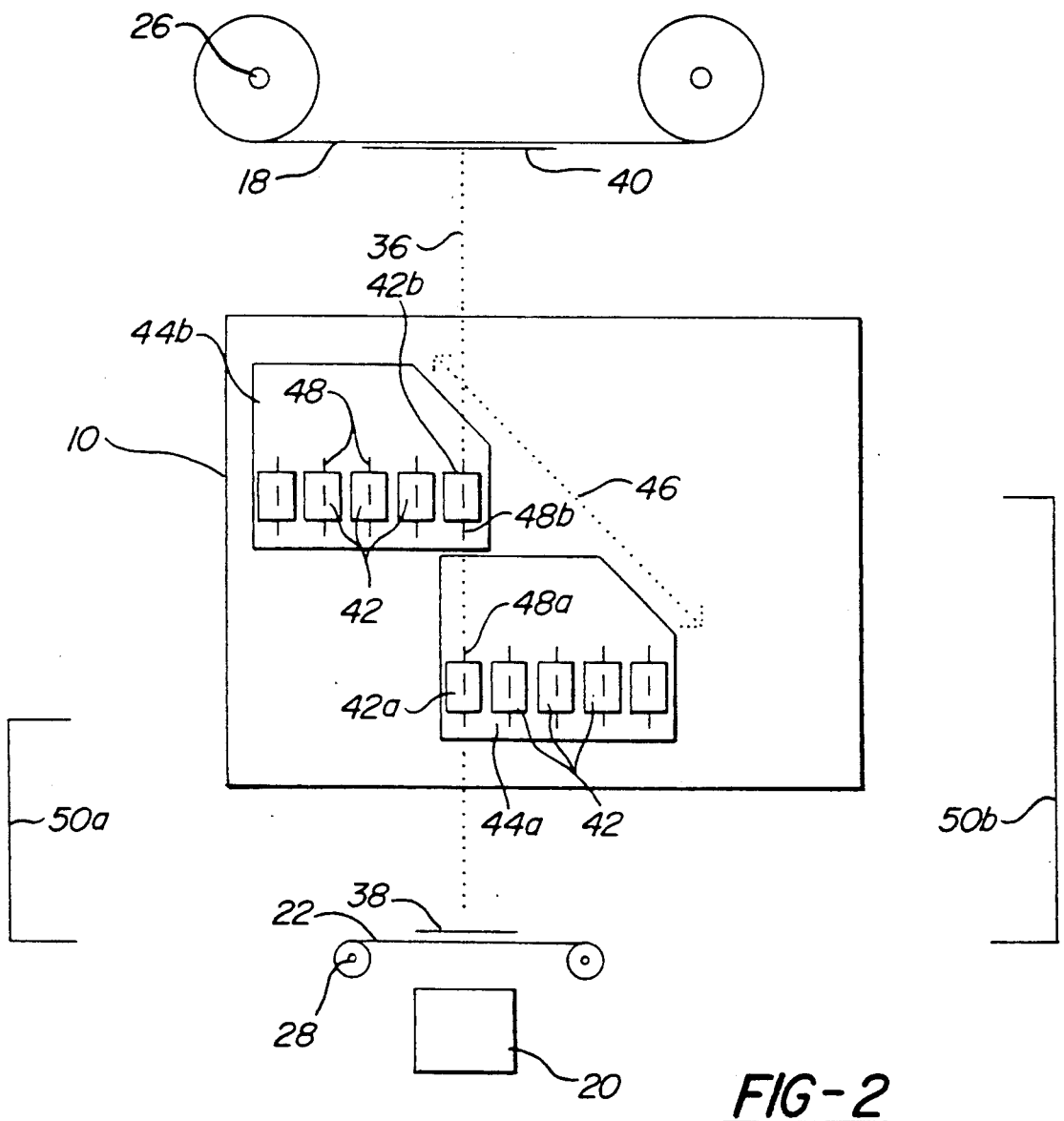
FIG. 2 is a simplified diagram of the invention lens deck as it relates to the various components of the photographic printer.

With reference now to FIG. 2, the lens deck 10 of the present invention is typically positioned along the optical center-line 36 of the printer 12. The optical center-line 36 can be defined as connecting the center of the negative image area 38 with the center of photographic paper exposure area 40. Thus, any lens 42 associated with the lens deck which is to be used in the printing process must also be centered along the optical center-line 36 to properly project the negative image onto the photographic paper 18.

Figure 3:
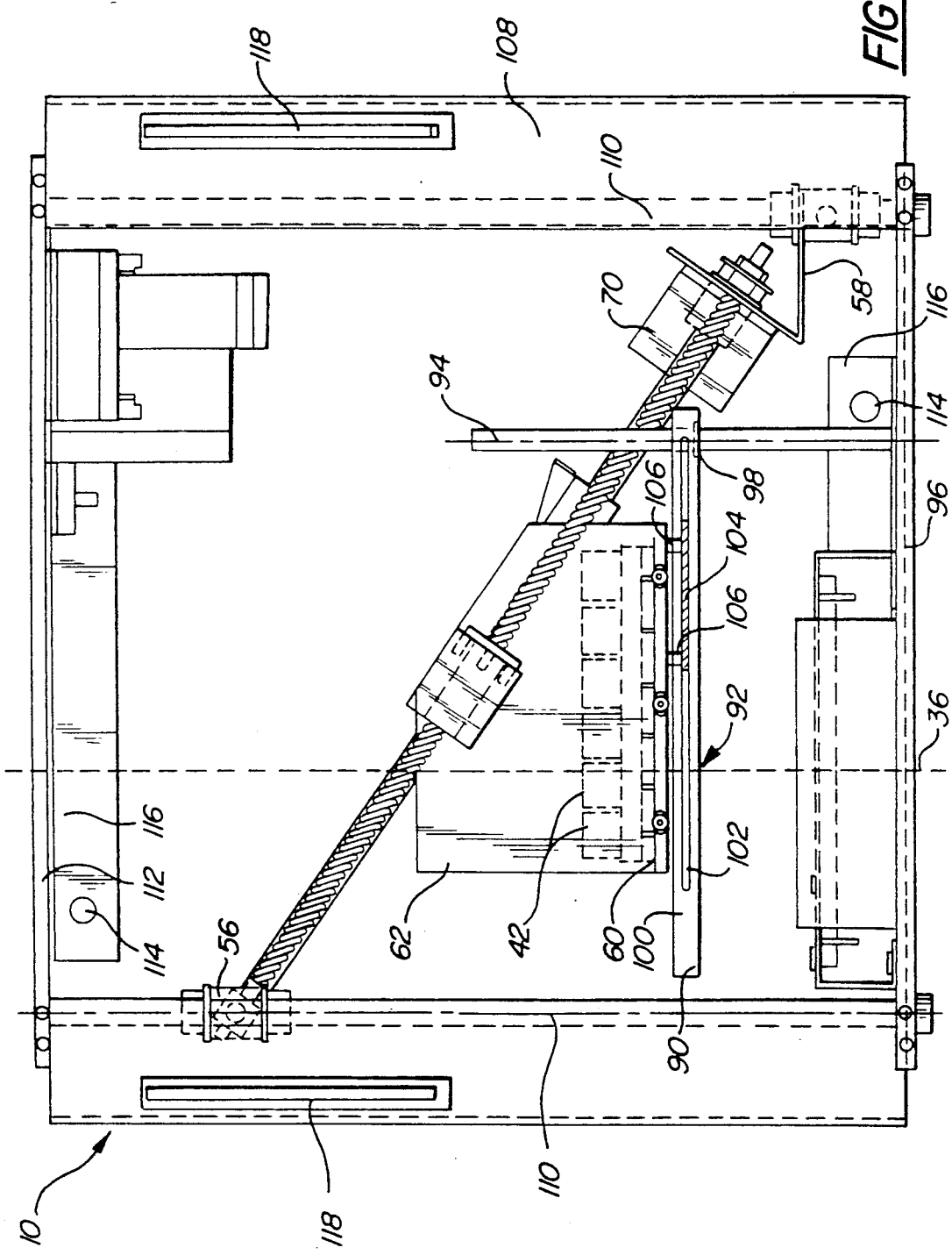
FIG. 3 is a detailed cut-away front view of the invention lens deck.
Figure 4:
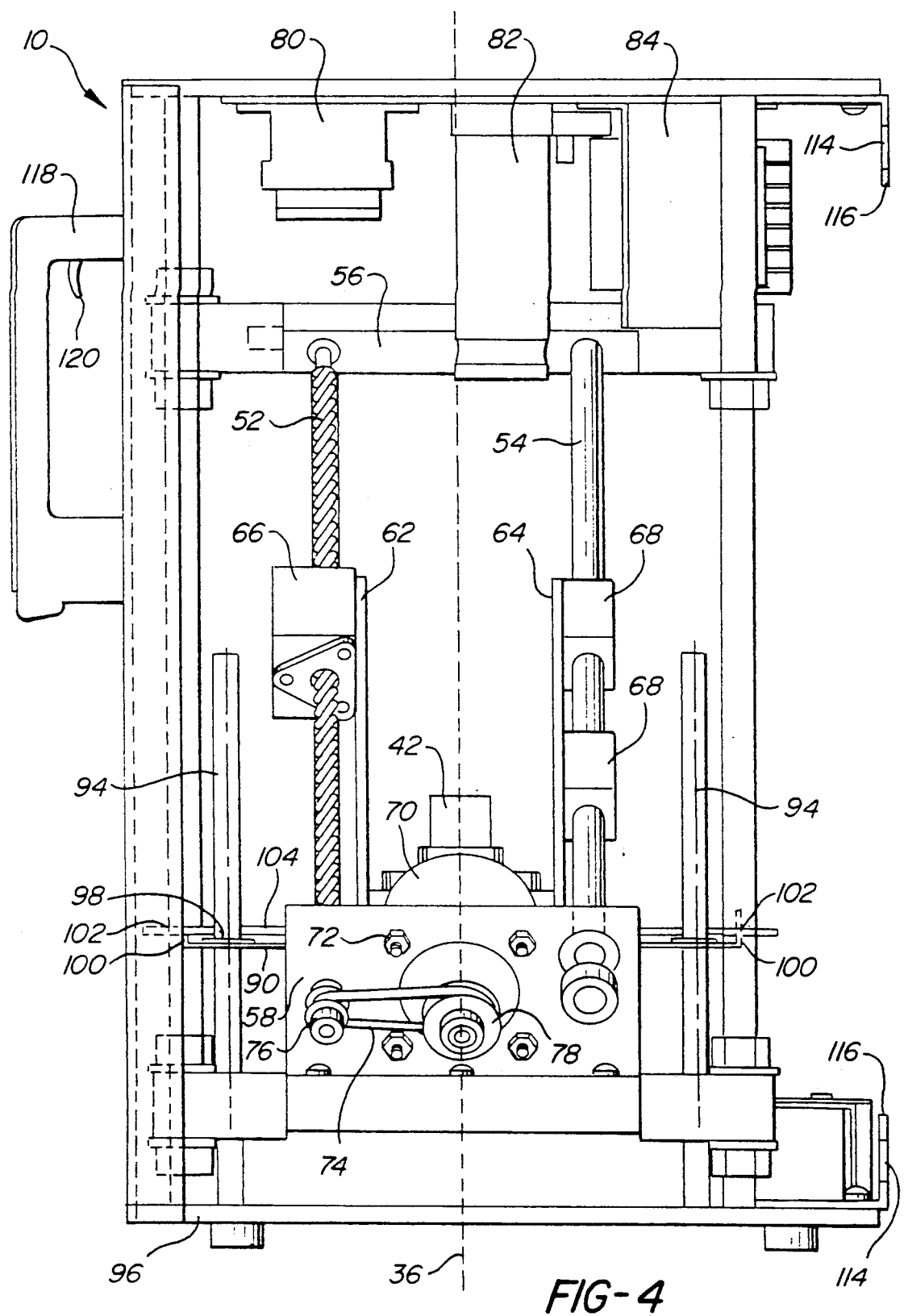
FIG. 4 is a detailed cut-away side view of the invention lens deck.

With reference also to FIGS. 3 and 4, the present invention provides a common carrier 44 on which a plurality of different lenses 42 are attached in an operatively fixed manner. Preferably, the lenses 42 are clamped. The lenses 42 have different powers of magnification and focal lengths as associated with lenses used to produce different size prints from different size negatives. The lenses 42 are arranged in a coplanar, substantially horizontal array so as to position the lowest magnification lens at one end of the common carrier 44, the highest magnification lens at the opposite end of the common carrier 44, and a progression of magnification strength intermediate lenses between the two previously mentioned lenses 42.

The common carrier 44 is adapted for movement along a path 46 that is oblique to the optical center-line 36. In this manner, the individual lenses 42 located on the common carrier 44 are successively moved into alignment at successively higher locations along the optical center-line 36 in response to movement of the common carrier 44 along the oblique path 46 from its lowest point to its highest point.

It is generally known in the field of the invention how to determine the necessary lens data, i.e. magnification, focal length, distance between the negative and the light sensitive paper, relative placement of the lens between the negative and the photographic paper, for a given negative size and desired photographic print size and shape. Further, potential combinations of these factors are so numerous that the invention is more easily understood with reference in general terms to combinations of sizes and shapes of negatives and prints for a given printer configuration.

It generally can be seen in FIG. 2 that the common carrier 44 of the present invention moves between two extreme positions 44a and 44b to allow positioning of all the associated lenses 42 along the optical center-line 36. When the carrier is located at position 44a, lens 42a has its own optical center-line 48a disposed colinearly with the optical center-line 36 of the printer 12. Lens 42a would have the highest magnification of all the lenses, and be associated with printing an image from the smallest size negative to which the given apparatus is directed. When the carrier is located at position 44b, lens 42b has its own optical center-line 48b disposed colinearly with the optical center-line 36 of the printer 12. Lens 42b would have the lowest magnification of all the lenses, and be associated with printing an image from the largest size negative to which the given apparatus is directed. The progression of lenses 42 between lenses 42a and 42b would have progressively smaller powers of magnification and generally correspond to progressively larger sized negatives.

An example of the types of film size ranges encountered would be 35 mm as the smallest negative requiring the highest magnification lens 42a to a 120 film size negative requiring the lowest magnification lens 42b. These film types are presented as but one example of the types of negative films which may be utilized by a printer 12.

Alternatively, the progression of lenses 42 from the highest magnification 42a to the lowest magnification 42b could correspond to resulting photographic print images of decreasing size from the same size negative. In other words, the same size photographic negative image would be subjected to decreasing magnifications. It should also be noted that lens 42a has the shortest focal length 50a as determined by the distance between the negative image and the lens 42a. Correspondingly, lens 42b has the longest focal length 50b, and the intermediate lenses 42 have a corresponding progression of focal lengths therebetween.

Preferably, the progression of lenses 42 accounts for both an increase in negative size and a decrease in desired print size, so that a single lens deck can produce multiple print sizes from multiple negative sizes. Thus, using the previously cited example, several size prints would be available for each negative size, i.e., 35 mm, 120, and any intermediate sizes.

The individual lenses 42 are aligned on the common carrier 44 having the individual lens center-lines 46 substantially coplanar with the optical center-line 36 so that movement of the common carrier 44 along the oblique path 46 can align each of the lenses on the optical center-line 36. As can be seen in the side view of FIG. 4, the lenses 42 are clearly so aligned. The relative placement of the lenses 42 with respect to one another, however, can only be determined after determining the required position of each lens 42 as it relates to the optical center-line 36. For example, when the common carrier is positioned at the lowermost position 44a, lens 42a is aligned along the optical center-line 36. The distance of the next consecutive lens 42 on the common carrier from lens 42a can be determined based on the angle of the oblique path 46 and the required position of the next lens along the optical center-line 36. These factors depend on the specific printing arrangement to which the next lens is directed; however, once these factors are known, placement of the next lens 42 relative the lens 42a can be determined from basic trigonometry.

Preferably, the lenses 42 are positioned as a substantially horizontal array of lenses 42 as depicted in FIG. 2. However, individual lenses may be located apart from the strict horizontal linear baseline path as depicted to accommodate large differences in relative placement of the lenses 42 along the optical center-line 36. For example, if the lens following lens 42a needs to be oriented on the center-line 3 inches higher than the position of lens 42a when lens 42a is so aligned, a specific relationship between the angle and distance from lens 42a results. If, however, the next lens needs to be 4 inches higher in alignment, the same angle and distance from lens 42a relationship may be utilized if the next lens is disposed one inch above the baseline of the horizontal array. In this manner, the lenses 42 may be placed in relative proximity to one another so as to minimize the overall size of the common carrier 44 and/or maximize the number of lenses 42 placed on a carrier 44 of given dimension.

With reference specifically now to FIGS. 3 and 4, an angled threaded drive bar 52 and a like angled, substantially non-threaded, guide shaft 54 are positioned in parallel angled orientations between and upper support bar 56 located on one side of the optical center-line 36 and a lower support plate 58 located on the opposite side of the optical center-line 36. The drive bar 52 and guide shaft 54 are oriented parallel to the oblique path 46 for carrier 44. Bearing units (not shown) at each support location operate to allow unfettered rotation of the drive bar 52. The exact angle of the drive bar 52 and guide shaft 54 depend on the available space in a specific printer and the range of lenses 42 to be utilized.

The common carrier is formed of several distinct elements which cooperate to engage the drive and guide systems and support the lenses 42. The common carrier 44 includes a flat base 60 adapted to support the plurality of lenses 42 thereon. The flat base 60 includes windows or through-holes aligned with each lens 42 for passage of light therethrough. Two vertical risers 62,64 operate to position a drive bar engagement block 66 for engagement with the angled threaded drive bar 52, and a pair of guide blocks 68 for slidable engagement with the like angled, substantially non-threaded, guide shaft 54.

A drive system disposed within the lens deck 10 operates to rotate the threaded drive bar 52 about the longitudinal axis of the threaded drive bar 52 to cause the common carrier 44 to move along a path 46 that is oblique to the optical center-line 36. The drive system includes a 1.8 degree stepper motor 70 mounted on the support plate 58 by suitable fastener means 72. The stepper motor 70 engages the drive bar 52 through belt 74 positioned on the back side of the support plate 58 between sprocket 76 associated with drive bar 52 and sprocket 78 associated with motor 70. The guide arrangement operates to retain the original orientation of the common carrier 44 as the common carrier 44 moves along the path 46 that is oblique to the optical centerline 36 in response to rotation of the threaded drive bar 52.

Figure 5:
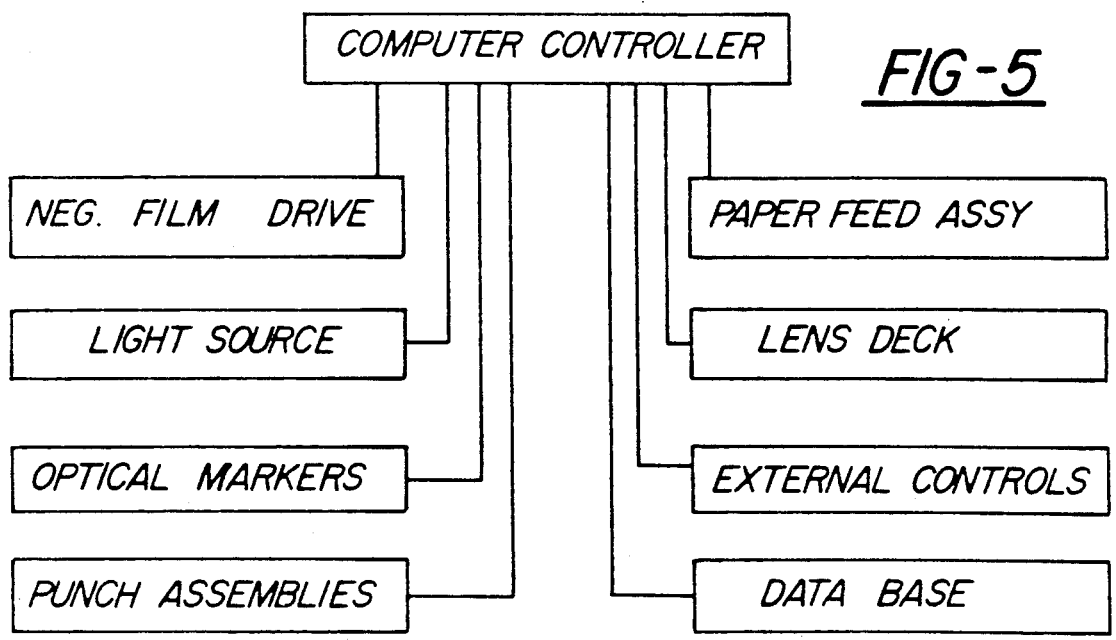
FIG. 5 is a diagram of a typical control network.

With reference also to FIG. 5, stepper motor 70 is electronically controlled so as to produce rotary motion in the drive bar 52. One such control system includes a drive control 80, capacitor 82, and transformer 84 connected to a central operations computer controller, such as disclosed with reference to FIG. 1, so as to electronically control the operation of the drive bar 52 in concert with the other processes associated with the printing process. The computer controller therefore coordinates the operations of the various components in a printer 12, such as the negative film drive 28, the light source 20, optical markers, punch assemblies, paper feed assembly 26 and lens deck 10. The computer controller utilizes both stored data, i.e., from a database or external disks 34, and keyboard 30 or other external controls to coordinate and/or automate the overall printing process. Other such control formats can be easily envisioned by one skilled in the art.

A mask 90 positioned proximate the common carrier 44 allows the lens 42 aligned along the optical centerline 36 to be used in connection with the photographic printer 12 and optically isolates the remaining lens 42 from the photographic printer 12. The mask 90 includes an opening 92 aligned along the optical center-line 36. The mask 90 is adapted to remain substantially fixed with respect to movement perpendicular to the optical center-line 36 to maintain the orientation of the opening 92 about the center-line 36; however, the mask 90 is allowed to move parallel to the optical center-line 36 in response to movement of the common carrier 44.

To maintain the proper orientation, a pair of secondary, substantially non-threaded, guide shafts 94 are rigidly disposed parallel to the optical center-line 36 so as to extend upwards from the floor 96 of the lens deck 10. The mask 90 includes openings 98 adapted to slidably engage the secondary guide shafts 94 so as to allow movement of the mask 90 parallel to the optical center-line 36 and prevent movement perpendicular to the optical center-line 36.

To allow for movement parallel to the vertical optical center-line 36 in response to movement of the common carrier 44, the common carrier 44 is further adapted to slidably engage the mask 90. The mask 90 includes upturned end portions 100 which have substantially parallel, horizontal slots 102 therethrough. The common carrier has a horizontal slide plate 104 disposed through the slots 102 on both end portions 100 and attached to the base plate 60 by leg members 106. This interconnection between the carrier 44 and mask 90 allows the mask 90 to vertically track the common carrier 44 while sliding horizontally with respect to one another. Since movement of the common carrier includes both horizontal and vertical components of motion, the mask 90 and carrier 44 simultaneously move both vertically together and horizontally relative one another so as to position each of the lenses 42 along the vertical center-line 36 over the opening 92 at different vertical positions along the center-line 36.

The lens deck 10 further includes front element 108, side wall elements 110, and top element 112, which cooperate with the floor element 96, mask 90, and the printer 12 to provide an environment relatively free of extraneous light for the printing process. Light incident from the light source 20 projects trough an opening in the floor 96, through the opening 92 in the mask 90, through the lens 42 on the center-line 36, and through an opening in the top element 112. The lens deck 10 is positioned on the printer 12 using openings 114 in back plates 116 to engage alignment pins (not shown) on the printer 12. Handle members 118 include trigger latching mechanisms 120, as is known in the industry, to secure the lens deck 10 on the alignment pins of the printer 12.

From the foregoing description of the preferred embodiment it can be seen that various alternative embodiments of the invention, such as types of lenses and lens units, orientations of the drive and guide systems, placement of lenses, and other alternatives, can be anticipated without departure from the scope of the invention as defined in the following claims.

I claim:

1. A mechanism for selectively positioning a plurality of different lens units along the optical center-line of a photographic printer, characterized in that the lens units are mounted on a common carrier and the lens units are successively moved into alignment along said optical center-line in response to movement of said common carrier along a path that is oblique to said optical center-line.

2. The mechanism of claim 1, wherein
said plurality of different lens units are arranged substantially horizontally with respect to one another on said common carrier.

3. The mechanism of claim 1, wherein
said plurality of different lens units comprise a plurality of lenses having different powers of magnification.

4. The mechanism of claim 1, wherein
said plurality of different lens units comprise a plurality of lenses having different focal lengths.

5. The mechanism of claim 1, wherein
said mechanism further includes a threaded drive bar disposed substantially parallel to said path that is oblique to said optical center-line; and
said common carrier is adapted to engage said threaded drive bar so that rotation of said threaded drive bar about the longitudinal axis of said threaded drive bar causes said common carrier to move along said path that is oblique to said optical center-line.

6. The mechanism of claim 5, wherein
said mechanism further includes guide means to retain the original orientation of said common carrier as said common carrier moves along said path that is oblique to said optical center-line in response to rotation of said threaded drive bar.

7. The mechanism of claim 6, wherein
said guide means includes a substantially non-threaded guide shaft; and
said common carrier is adapted to engage said substantially non-threaded guide shaft.

8. The mechanism of claim 1, wherein
said mechanism further includes a mask positioned proximate said common carrier and operative to allow the lens unit aligned along said optical center-line to be used in connection with the photographic printer and to optically isolate the remaining lens units from said photographic printer.

9. The mechanism of claim 8, wherein
said mask includes an opening aligned along said optical center-line, said mask being adapted to move parallel to said optical center-line in response to movement of said common carrier, said mask further being substantially fixed with respect to movement perpendicular to said optical center-line.

10. The mechanism of claim 9, wherein
said mechanism includes at least one secondary guide shaft disposed parallel to said optical center-line; and
said mask is adapted to slidably engage said secondary guide shaft so as to allow movement of said mask parallel to said optical center-line and prevent movement perpendicular to said optical center-line.

11. A detachable lens deck for use in a photographic printer of the type adapted to systematically expose successive photographic print images on an elongated web of photographic paper from an elongated strip of successive photographic negative images, the detachable lens deck being adapted for selectively positioning a plurality of lenses along the optical center-line of a photographic printer, and characterized in that the lenses are mounted on a common carrier in an operationally fixed manner, each of said lenses have a different power of magnification, and the lenses are successively moved into alignment along said optical center-line in response to overall movement of said common carrier.

12. The detachable lens deck of claim 11, wherein
said plurality of lenses are arranged substantially horizontally with respect to one another on said common carrier.

13. The detachable lens deck of claim 11, wherein
said lens deck further includes a threaded drive bar disposed substantially along a path that is oblique to said optical center-line; and
said common carrier is adapted to engage said threaded drive bar so that rotation of said threaded drive bar about the longitudinal axis of said threaded drive bar causes said common carrier to move along said path that is oblique to said optical center-line.

14. The detachable lens deck of claim 13, wherein
said lens deck further includes guide means to retain the original orientation of said common carrier as said common carrier moves along said path that is oblique to said optical center-line in response to rotation of said threaded drive bar.

15. The detachable lens deck of claim 14, wherein
said guide means includes a substantially non-threaded guide shaft; and
said common carrier is adapted to engage said substantially non-threaded guide shaft.

16. The detachable lens deck of claim 13, wherein
said lens deck further includes a mask positioned substantially between said common carrier and said elongated strip of photographic negative images, said mask being operative to allow the lens aligned along said optical center-line to be used in connection with the photographic printer and to optically isolate the remaining lenses from said photographic printer.

17. The detachable lens deck of claim 16, wherein
said mask includes an opening aligned along said optical center-line, said mask being adapted to move parallel to said optical center-line in response to movement of said common carrier, said mask further being substantially fixed with respect to movement perpendicular to said optical center-line.

18. The detachable lens deck of claim 17, wherein
said lens deck further includes at least one secondary guide shaft disposed parallel to said optical center-line; and
said mask is adapted to slidably engage said secondary guide shaft so as to allow movement of said mask parallel to said optical center-line and prevent movement perpendicular to said optical center-line.

19. A detachable lens deck for use in a photographic printer of the type adapted to systematically expose successive photographic print images on an elongated web of photographic paper from an elongated strip of successive photographic negative images, said lens deck being adapted for positioning along the optical center-line between the negatives and photographic paper, comprising:
a threaded drive bar disposed within said lens deck substantially parallel to a path that is oblique to said optical center-line;
a substantially non-threaded guide shaft disposed within said lens deck;
a carrier disposed within said lens deck and adapted to engage said threaded drive bar and said substantially non-threaded guide shaft;
drive means disposed within said lens deck operative to rotate said threaded drive bar about the longitudinal axis of said threaded drive bar to cause said common carrier to move along a path that is oblique to said optical center-line, while said guide shaft retains said common carrier in its preferred orientation as said common carrier moves along said path;
a plurality of lenses mounted in a substantially horizontal relationship with respect to one another on said carrier in an operationally fixed manner, each of said lenses have a different power of magnification;
at least one secondary guide shaft disposed parallel to said optical center-line within said lens deck; and
a mask positioned substantially between said common carrier and said elongated strip of photographic negative images, said mask having an opening aligned along said optical center-line, said mask further being adapted to slidably engage said at least one secondary guide shaft so that said mask may move parallel to said optical center-line in response to movement of said common carrier but remain substantially fixed with respect to movement perpendicular to said optical center-line,
whereby said detachable lens deck may be utilized to successively move different individual lenses into alignment along said optical center-line in response to movement of said common carrier along a path that is oblique to said optical center-line while optically isolating the remaining lenses from said photographic printer so as to produce different photographic paper print exposures from a single negative image.

20. A method of exposing a photographic print on an elongated web of photographic paper from an elongated strip of photographic negative images in a photographic printer, comprising the steps of:

providing a common carrier operatively positioned along the optical center-line between the elongated web of photographic paper and the elongated strip of photographic negatives;

providing a plurality of different lenses on said common carrier;

moving said common carrier along a predetermined path so as to position one of said plurality of lenses in alignment along said optical center-line, said movement having a partial component of motion parallel to the said optical center-line; and exposing a photographic image on the web of photographic paper along said optical center-line through said positioned lens.

21. The method of claim 20, wherein
said stop of providing a plurality of different lenses includes the step of providing a plurality of lenses having different powers of magnification.

22. The method of claim 20, wherein
said step of providing a plurality of different lenses includes the step of providing a plurality of lenses having different focal lengths.

23. The method of claim 20, wherein
said stop of moving said common carrier includes the step of moving said common carrier along a path that is oblique to said optical center-line.

* * * * *

UNITED STATES PATENT AND TRADEMARK OFFICE
CERTIFICATE OF CORRECTION

PATENT NO. : 5,099,275
DATED : March 24, 1992
INVENTOR(S) : Hicks

It is certified that error appears in the above-identified patent and that said Letters Patent is hereby corrected as shown below:

Column 12, line 7, delete "stop" and insert --step--;

Column 12, line 15, delete "stop" and insert --step--;

On the Title Page, Item [57], line 11, delete "of", second occurrence, and insert --or--.

Signed and Sealed this

Twenty-first Day of June, 1994

*Attest:*

BRUCE LEHMAN

*Attesting Officer*     Commissioner of Patents and Trademarks